Figure 14:
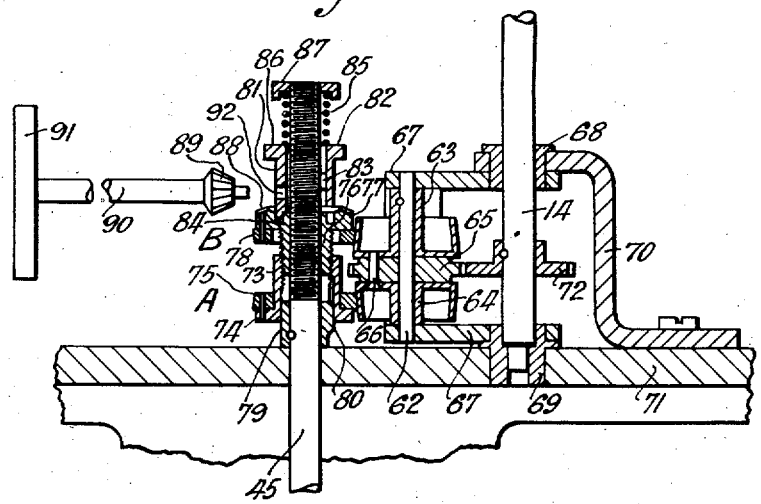

Aug. 25, 1936.  R. E. HANDFORD  2,052,530
LIQUID MEASURING APPARATUS
Original Filed July 25, 1931   6 Sheets—Sheet 1
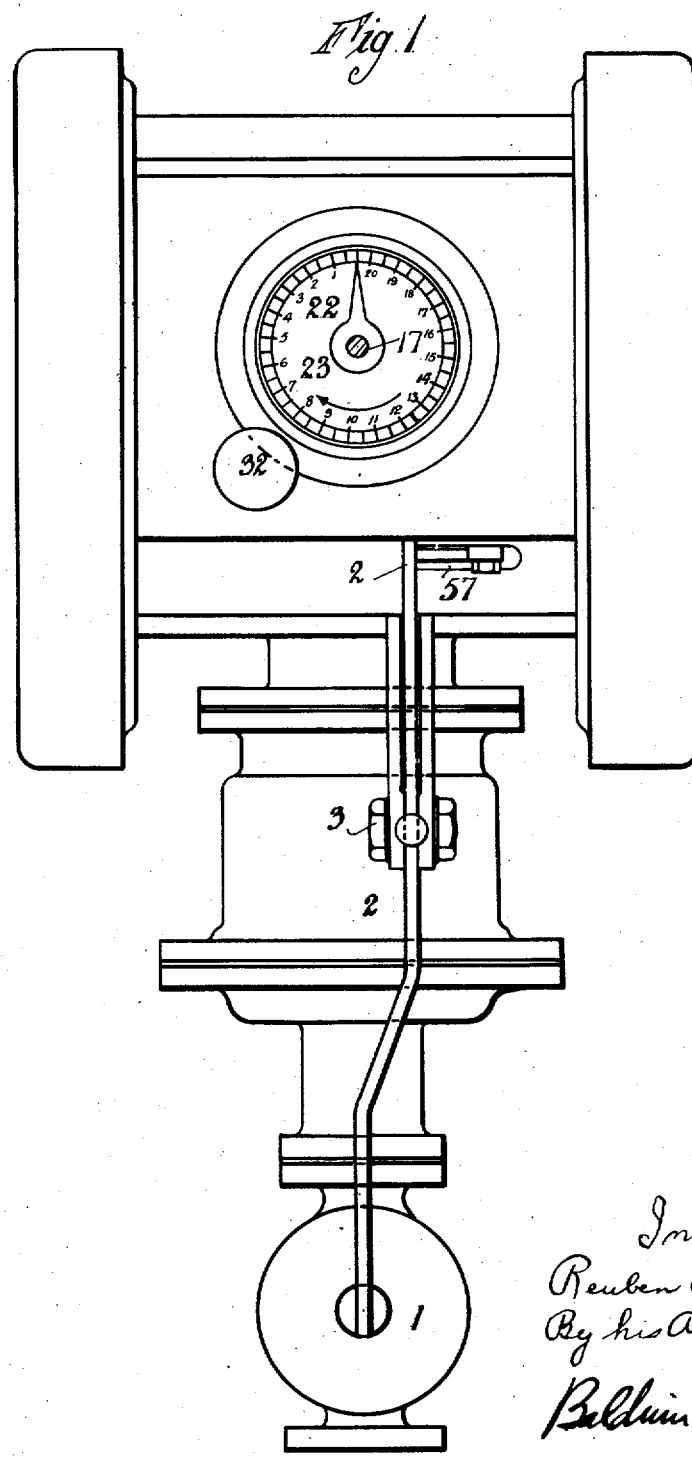

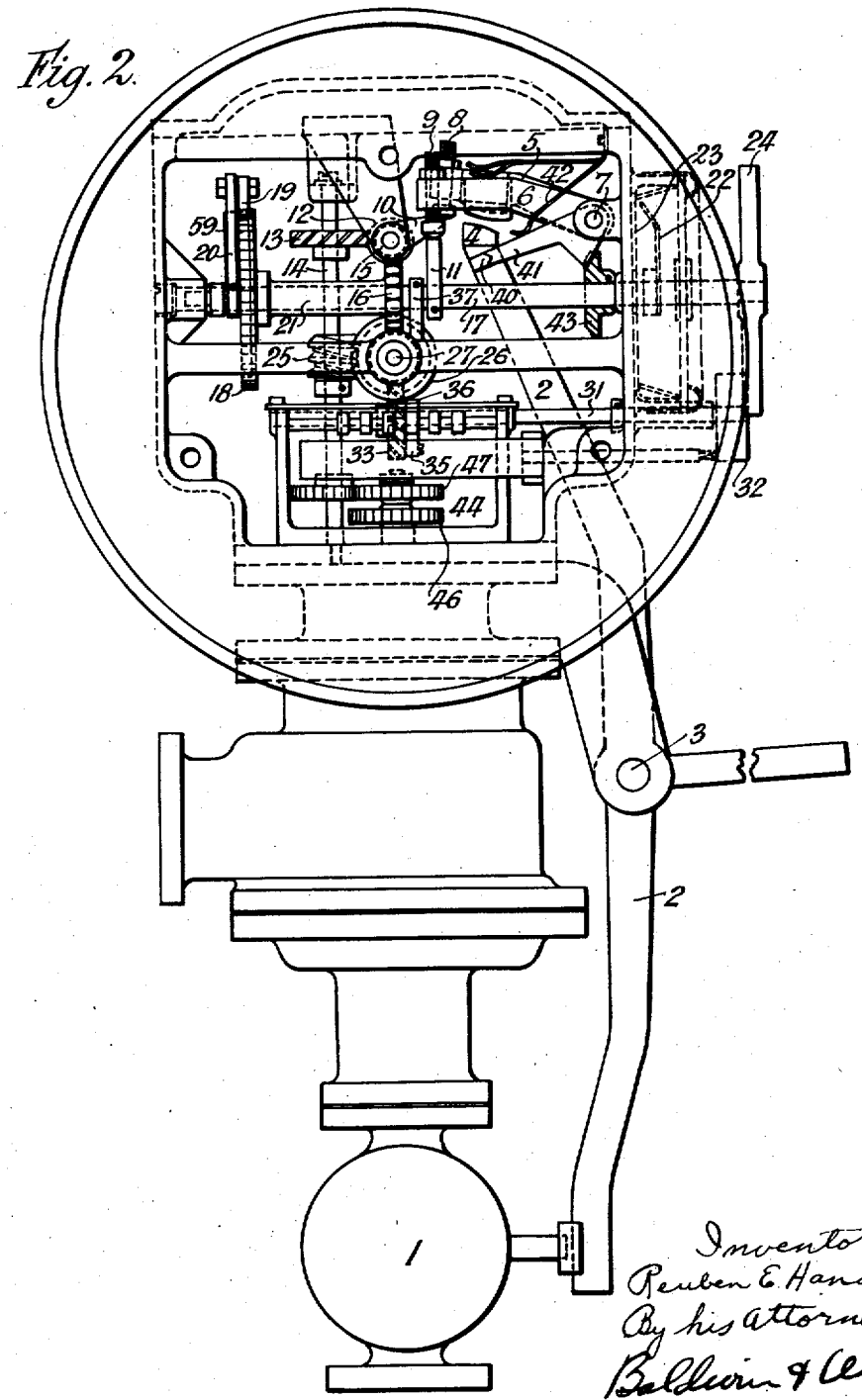

Aug. 25, 1936.  R. E. HANDFORD  2,052,530
LIQUID MEASURING APPARATUS
Original Filed July 25, 1931  6 Sheets—Sheet 3
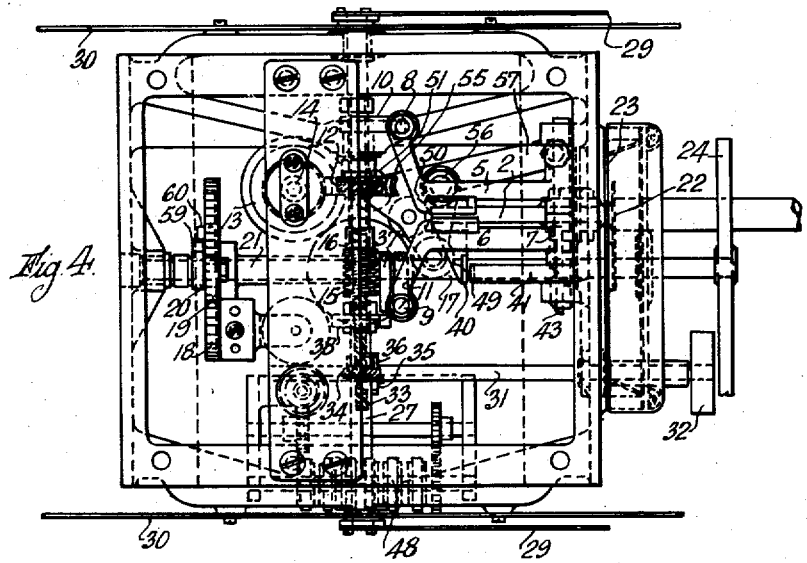
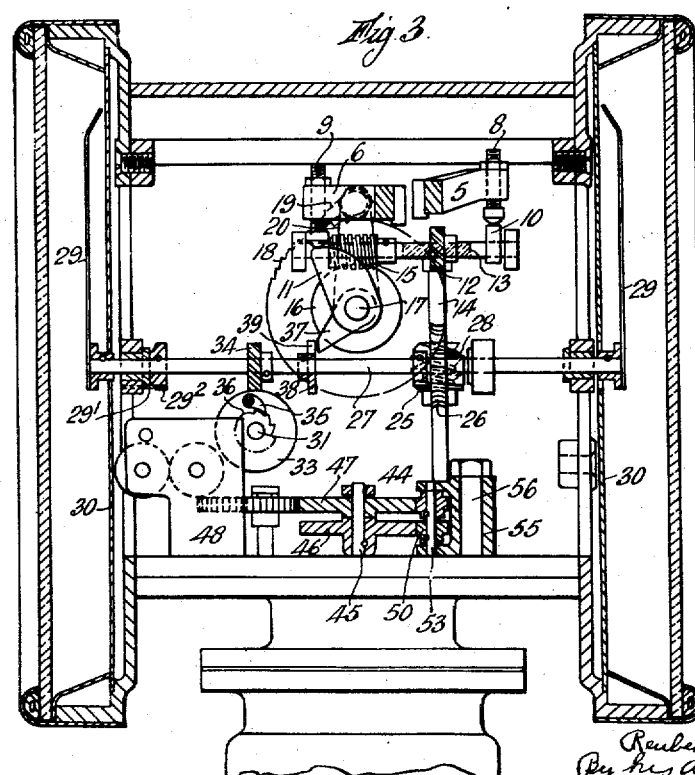

Aug. 25, 1936.　　　R. E. HANDFORD　　　2,052,530
LIQUID MEASURING APPARATUS
Original Filed July 25, 1931　　6 Sheets-Sheet 4
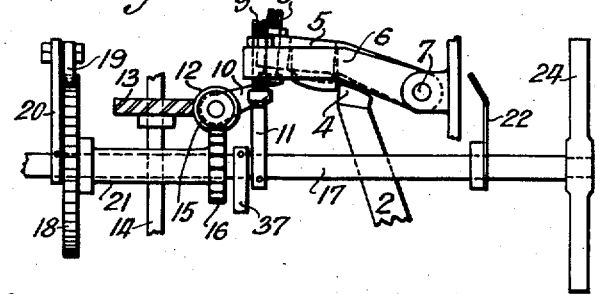
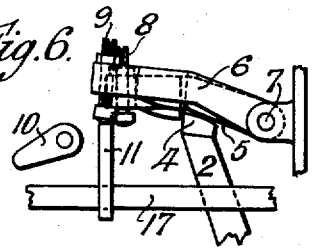
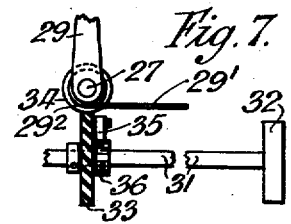
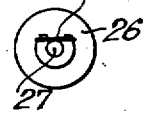
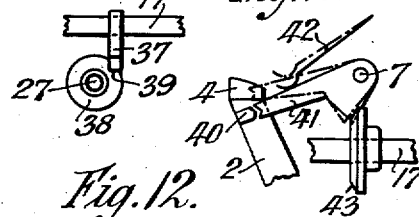
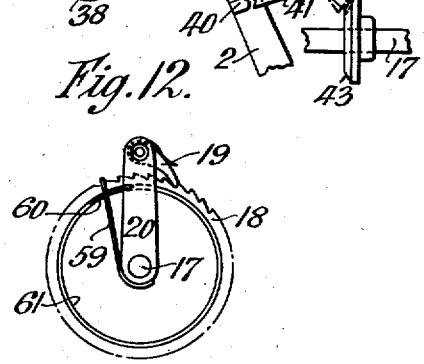
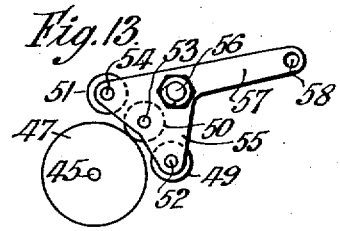

Aug. 25, 1936.  R. E. HANDFORD  2,052,530
LIQUID MEASURING APPARATUS
Original Filed July 25, 1931    6 Sheets-Sheet 5

Inventor
Reuben E. Handford
By his Attorneys,
Baldwin & Wight

Aug. 25, 1936. R. E. HANDFORD 2,052,530
LIQUID MEASURING APPARATUS
Original Filed July 25, 1931 6 Sheets-Sheet 6

INVENTOR
REUBEN E. HANDFORD.
BY
Frederick Griswold Jr
ATTORNEY

Patented Aug. 25, 1936

2,052,530

UNITED STATES PATENT OFFICE 2,052,530

LIQUID MEASURING APPARATUS

Reuben Ernest Handford, Luton, England, assignor, by mesne assignments, to L. N. S. Corporation, New York, N. Y., a corporation of Delaware Application July 25, 1931, Serial No. 553,224. Renewed February 15, 1935. In Great Britain September 23, 1930

48 Claims. (Cl. 221—101)

One feature of this invention relates to liquid measuring apparatus and more particularly to apparatus for the retail sale of petrol and the like, and has for its object to provide means actuated automatically by the liquid flow responsive device of a petrol or like meter for cutting off the supply of liquid to be measured when the exact quantity required has been delivered.

According to this feature of the invention means for cutting off the supply of liquid comprises a self-closing cock which is held open for the delivery of liquid by two detent mechanisms one of which determines the approximate time of cut-off and is adapted to be released just before a required quantity of liquid has been delivered, and the other of which determines the exact time of cut-off and is adapted to be released when the required quantity of liquid has been delivered so that error in the gearing or controlling part will be maintained at a minimum value.

In a preferred embodiment the apparatus is arranged to deliver predetermined exact multiples of the smallest quantity of liquid to be measured and the detent mechanism which determines the exact time of cut-off is adapted to be released each time the smallest quantity of liquid to be measured has passed and the detent mechanism which determined the approximate time of cut-off is adapted to be released just before the required multiple of the said smallest quantity has passed.

Preferably means are also provided whereby a readily observable indication is given to a purchaser that the correct quantity of liquid has been delivered.

To this end the invention includes the provisions of means to insure that the observable indication is accurate and solely dependent upon the amount of liquid dispensed in a given transaction without being subject to manipulation by an operator to present a false indication.

The invention seeks to provide in a liquid dispensing apparatus the combination of a meter having mechanism for resetting the meter to zero position, means for delivering liquid through the meter, valve means for controlling the flow of liquid, actuating means for opening and closing the valve means, said resetting means and actuating means being interconnected to prevent operation of the actuating means to open said valve means after completion of a liquid delivery until the resetting means has been actuated to reset the meter to zero.

A further object resides in providing in a liquid dispensing apparatus the combination with a meter for measuring the volume of liquid dispensed, of a pump for dispensing liquid through said meter; means for indicating the volume of liquid thus dispensed at each dispensing operation; a valve operatively connected in series with said pump; means for controlling the operation of said valve; set-back mechanism for restoring said indicating mechanism to zero position; and means operatively connecting said set-back mechanism with said controlling means whereby said valve is held closed after each dispensing operation until the indicating mechanism is set back to zero position.

Another object is to provide a liquid dispensing system including flow establishing means, valve means controlling the flow of liquid, means for holding the valve means in open position, means for holding the valve means in closed position, a liquid meter for measuring the dispensed liquid, an indicator driven by said meter and having a predetermined initial position, and means to prevent opening the valve means when said indicator is in other than initial position.

Other objects and advantages which are embraced within this invention will be apparent from the sequent description and appended claims.

According to a further feature or modified form of the invention a variable velocity ratio device comprises a coned member, a disc whose periphery engages the surface thereof, means for causing relative axial movement between the coned member and the disc to enable the velocity ratio to be varied, and means for mounting the coned member and disc in such relationship to each other that the tangential driving force between the coned member and the disc tends to move them bodily relatively to one another to increase the radial pressure between them.

Preferably two discs are employed and the coned member is in the form of a double cone with the coned surfaces oppositely directed, one surface being engaged by one disc and the other by the other disc. In this construction, the discs are moved axially in opposite directions to an equal extent so that the discs are at all times symmetrical about the transverse mean centre of the double cone.

Figure 15:
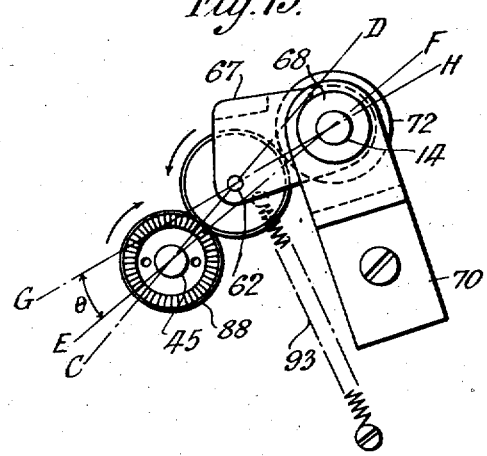
Figure 16:
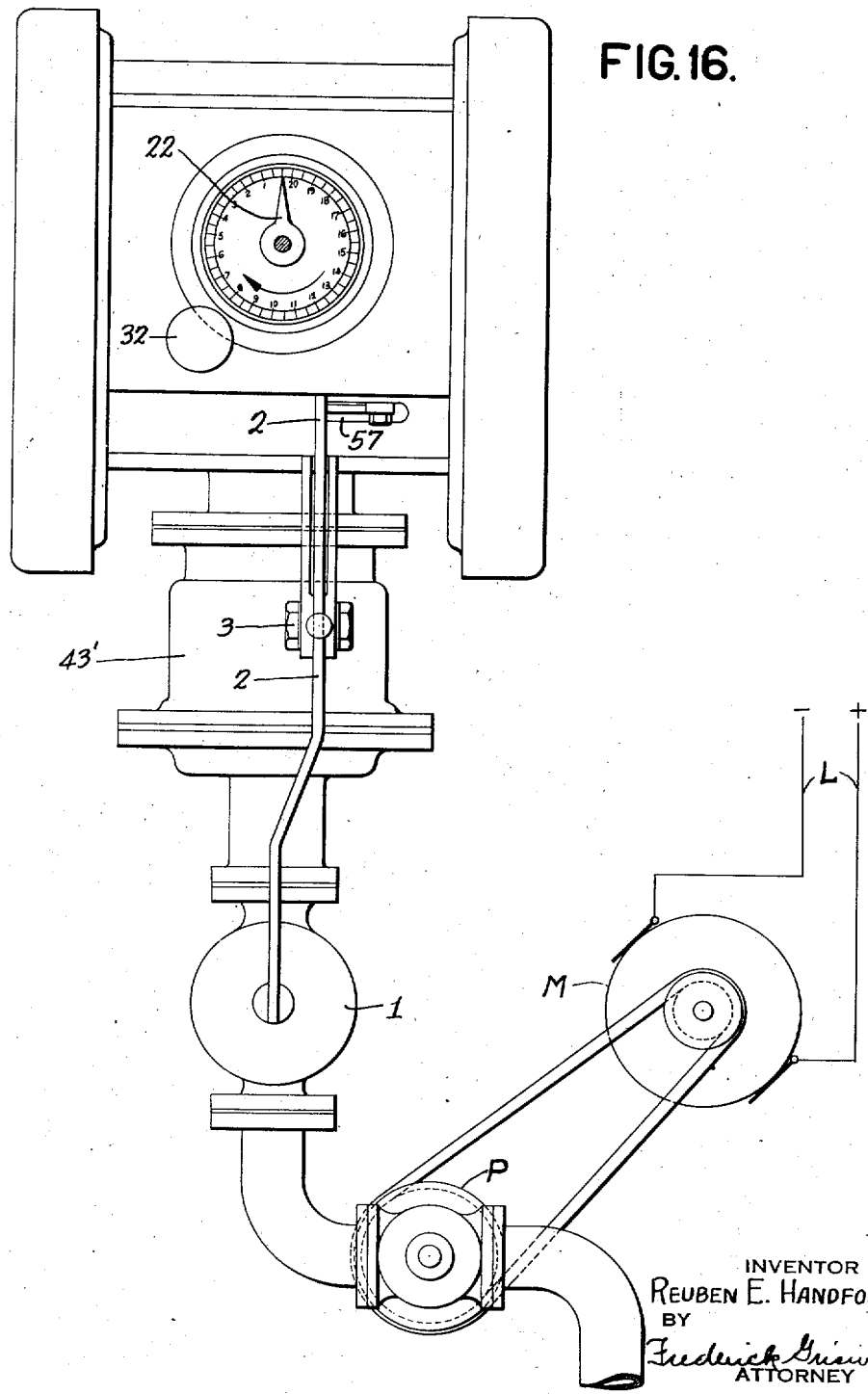

The invention is illustrated in the accompanying drawings, in which Figure 1 is a side elevation, Figure 2 an end elevation with a front indicator removed, Figure 3 a fragmentary vertical section partly in elevation, Figure 4 a plan view with the front and rear covers removed, and Figures 5–13 detail views. Figures 14 and 15 are views of a variable velocity ratio mechanism constructed according to one feature of this invention and described as applied to the apparatus shown in Figures 1-13. Figure 16 is a view somewhat diagrammatic, showing in combination a motor, pump, valve, meter and indicator.

In the construction illustrated in Figures 1-13, of the accompanying drawings, the apparatus is arranged to deliver half gallons and any exact multiple thereof up to a maximum of twenty gallons, as determined by a pre-setting device to be described later. The detent mechanism determining the exact time of cut-off will in this case be released each time one-half gallon has been delivered, the approximate cut-off detent being released when there remains about one-quarter of a gallon to be delivered to make up the required quantity.

1 is a pump cock or valve acting as a flow controlling means for cutting off the supply of liquid, the cock being of the plunger-operated type, spring biased to the off position, and is adapted to be opened by the engagement of one end of a cock lever 2 with said plunger. The cock lever is pivoted at a point 3 and is provided at the other end with a hardened face 4 which is adapted to be engaged by two catches or detents 5, 6, when the lever is moved to actuate the cock plunger, thus holding the cock open against the action of its spring, the detents being pivotally mounted at 7. The detents are provided with adjustable stops or tappets 8, 9, adapted to be engaged by cams 10, 11, for the release of the detents.

The cam 10 is arranged to be driven through gearing comprising skew gears 12, 13, from a spindle 14 driven in the manner hereinafter described from the fluid flow responsive device of an appropriate petrol or like meter, so that the cam 10 makes one revolution for each half gallon delivered, while the other cam 11 is geared through reduction gearing comprising a worm and worm wheel 15, 16, to the first so that the cam 11 makes one complete revolution for forty revolutions of the cam 10.

In order to enable the quantity of liquid required to be pre-set, the slow speed cam 11, associated with the approximate cut-off detent 6, is fast with a spindle 17 which is driven through a ratchet wheel 18 and pawl 19, the said ratchet wheel having forty teeth, each corresponding to one-half gallon. The pawl is mounted in an arm 20 which is also secured to the spindle 17 and the ratchet wheel 18 is secured on a hollow spindle 21 which is fast with the worm wheel 16 so as to be driven thereby. The spindle 17 is provided with a pre-setting pointer 22, associated with a fixed dial 23, graduated in half gallons, and a handle 24. Thus, when it is desired to pre-set the meter to the quantity ordered, the handle 24 is turned in the direction of the arrow in Figure 1 to set the cam 11 in the corresponding position, the pawl 19 slipping idly over the ratchet wheel 18 which remains stationary.

The spindle 14 is also provided with a worm 25 in mesh with a worm wheel 26 which is coupled to a spindle 27 through a slipping clutch comprising a blade spring 28 (Figure 8) co-operating with the spindle 27. Said spindle 27 is provided with pointers 29 which move over dials 30.

The operation of the parts so far described is as follows:—

The setting handle 24 is turned, thereby rotating the spindle 17, arm 20 and pawl 19, the slow speed cam 11 and the setting pointer 22, until the latter indicates the required amount on the indicating dial 23. The cock lever 2 is then rocked to open the cock and is engaged and held by the detent 6. The flow establishing means or pump P driven by a motor M is then started by energizing the line L and the flow of liquid from the pump through the meter drives the spindle 14, and hence the cams 10 and 11 associated with the two detents 5 and 6, the cam 10 associated with the accurate cut-off detent 5 rotating once for each half gallon and the slow speed cam 11 associated with the approximate cut-off detent 6 being driven by the pawl and ratchet wheel. It will be seen that the time of approximate cut-off will be determined by the number of ratchet teeth (each representing a half gallon) which the pawl 19 slipped over when pre-setting the setting handle 24. Assuming, for example, that the setting handle has been pre-set to 10 gallons, the slow speed cam 11 will release the approximate cut-off detent 6 when about 9¾ gallons have been delivered. The cock lever 2 is held during this period by the accurate cut-off detent 5 until the cam 10 associated therewith effects its release at the end of the twentieth half gallon, whereupon the pump cock 1 closes under the action of its spring.

It will be seen that whereas the cam 11 is displaced only through a distance dependent on the quantity of liquid ordered, the cam 10 moves through one complete revolution for each unit (in the present example ½ gallon) delivered and thus moves through a much greater total distance than the cam 11; thus by arranging the cam 10 to effect the final release of the lever 2, any error which there may be bears in proportion to the total distance travelled by the cam 10 a very much smaller value than its proportion to the travel of the cam 11. It will of course be understood that the provision of the cam 11 and its detent 6 is necessary to prevent the cam 10 and its detent 5 from releasing the lever 2 each half gallon delivered until the half gallon is that required to complete the quantity ordered.

During the time liquid is being delivered the spindle 17 carrying the slow speed cam gradually moves the setting pointer 22 to zero, indicating in this position to a purchaser that the correct quantity of liquid has been supplied.

The pointers 29 are zeroized by means comprising a zeroizing spindle 31 provided with an actuating handle 32 and with a skew gear wheel 33 in mesh with a skew gear wheel 34 secured to the spindle 27 on which the pointers are mounted; the gear wheel 33 is connected to the spindle 31 by a slipping clutch comprising a pawl 35 and ratchet wheel 36, so that the spindle 27 can be rotated by the spindle 14 independently of the zeroizing spindle 31, and the zeroizing spindle is permitted to effect the actuation of the spindle 27 while the spindle 14, and hence the worm wheel 26, is stationary by the slipping clutch 28 first described. In order to prevent the indicator pointers 29 from being moved by the zeroizing spindle 31 past the zero position, a blade spring 29' is provided to abut against a tooth 29² on a disc secured to the spindle 27.

Referring to Figure 3, the cam 11 on the spindle 17 is shown in the position it will occupy after it has lifted the detent 6 to discontinue delivery. In order to present the apparatus preparatory to delivering a further predetermined quantity of fluid, the spindle 17 and the cam 11 are rotated by means of the handle 24 in a clockwise direction until the cam moves clear of the detent 6, the cam being rotated through an angular displacement dependent upon the quantity of fluid desired to be delivered.

In order to prevent the presetting handle 24 from being moved to effect a fresh presetting operation until the pointers 29 have been zeroized, the presetting spindle is provided with a cam or projection 37 which cooperates with a disc 38 on the spindle 27 in such a manner as to prevent the spindle 17 from being rotated to effect the pre-setting until a cut away part 39 on the disc 38 comes into register with the cam or projection 37, this registration being effected only when the pointers have been returned to their zero position by the zeroizing spindle 31. During delivery, the ratchet wheel 18 will drive the spindle 17, the cam 11, and the projection 37 still in a clockwise direction until the cam 11 engages and raises the detent 6 to release the lever 2, this action taking place just before the projection 37 engages the disc 38, i. e., when the projection 37 arrives at its Figure 3 position. Thus the disc 38 will not interfere with operation of the spindle 17 and the cam 11 during delivery.

In order also to prevent the cock opening lever 2 from being moved to open the cock until the presetting pointer 22 has been moved from its zero position, the lever 2 is provided with a lug 40 which is in register with a detent lever 41 pivotally mounted at 7 and urged by a spring 42 into a recess formed in a disc 43 secured to the spindle 17. The recess registers with the lever 41 only when the presetting pointer 22 is at zero and when the pointer is moved from its zero position the disc effects the rocking of the lever 41 so that it moves out of register with the lug 40 and thus allows the lever to be moved to open the cock.

The drive from the fluid flow responsive device to the spindle 17 is effected through a gearing indicated generally by the numeral 44, the drive being transmitted from the device to the gearing by a spindle 45. In order to enable a slight adjustment to be made to the rate of actuation of the meter, the gearing 44 is variable; the gearing comprising a driving gear 46 secured to the spindle 45, and a driven gear 47, loosely mounted on the spindle, which transmits the drive to the spindle 17 and also to a counter mechanism denoted generally by the reference 48. The drive is transmitted from the drive gear 46 to the driven gear 47 through any one of three pairs of gears 49, 50 and 51 which are secured to spindles 52, 53, 54 rotatably mounted in a bracket 55 pivotally mounted at 56 and provided with an extension 57 having an aperture 58 by means of which the bracket can be locked in the selected position by means of a bolt which can be sealed. The three pairs of gears 49, 50, 51 are such as to give slightly different ratio between the gears 46, 47 so that a fine adjustment can be made of the rate at which the meter is driven. The pair of gears 51 may for example be such as to give a .35% reduction to the rate and the pair of gears 49 such as to give a .35% increase, the pair of gears 50 being the normal driving gears.

In order to ensure that at the end of a presetting operation the pawl 19 shall be in engagement with a tooth on the ratchet wheel 18 and thereby prevent lag or loss in pick up to the drive, the arrangement shown more particularly in figures 11 and 12 is employed; the arm 20 is provided with a blade spring 59 which abuts at its free end against a blade spring 60 sprung into an annular recess 61 provided in the ratchet wheel 18. Thus, when the spindle 17 is turned to pre-set the meter, the arm 20 first moves relatively to the blade spring 59 until the arm moves into definite engagement therewith whereupon the arm moves the spring in the recess; during the time that the arm 20 moves relatively to the spring 60 the blade spring 59 is compressed, and if, at the end of the pre-setting operation, the pawl is not in contact with a tooth in the ratchet wheel, the spring 59 moves the arm in the reverse direction until the pawl moves into engagement with a tooth and thereby prevents loss in pick up.

The fluid flow responsive device comprises what is commonly known as the semi-rotary piston type, consisting of a piston which is recessed to accommodate a dividing partition secured in a circular working chamber, the piston moving with a semi-rotary movement about the partition in a plane at right angles to its axis; such a meter is illustrated in my co-pending application Serial No. 553,223 and in the British specification No. 213,061, and further description is therefore believed unnecessary.

Reference will now be made to Figures 14 and 15 which illustrate a variable velocity ratio device constructed according to one feature of this invention and described as applied to the liquid measuring apparatus shown in Figures 1–13. In place of the gearing 49, 50, and 51 illustrated in Figure 13, a spindle 62 is provided with two truncated conical members arranged base to base and formed by coned flanges on sleeves 63, 64 pinned to the spindle, a ring 65 provided on its periphery with gear teeth being interposed between the two members and secured thereto by a rivet 66. The spindle 62 is rotatably mounted in a bracket 67 which is pivotally mounted on bushes 68, 69 secured respectively in a cranked arm 70 and a frame 71 to which the arm 70 is secured; the spindle 14 which is to be driven is rotatably mounted in the bushes 68, 69 and is provided with a gear wheel 72 in mesh with the gear teeth on the ring 65 secured to the conical members.

The spindle 45 is provided with two discs denoted generally by A, B which are engaged by the coned members, and it will be seen that the spindle 45 is located on that side of the spindle 62 which is remote from the spindle 14, i. e. of the pivotal axis of the bracket 67.

The location of the pivotal axis of the bracket 67 in relation to the axes of the two spindles 45 and 62 is such that the said axis is displaced in the direction of rotation at the point of contact between the discs and conical members, from a line C—D passing through the axes of the two spindles 45, 62; we have found that a location which provides an efficient drive occurs when the angle between a line E—F passing through the pivotal axis of the bracket and the axis of the spindle 45 carrying the discs and a line G—H also passing through the pivotal axis of the bracket and the axis of the spindle 62 on which the coned members are mounted is approximately 10° when the discs and coned members are in engagement at the mean diameter of the coned members.

The discs A, B, will, by the tangential driving force exerted between themselves and the conical members, tend to move about the pivotal axis of the bracket 67 to increase the radial force urging them into contact, and by arranging the parts with the angle referred to, this tendency is utilized to obtain a maximum of grip without however, introducing the tendency to jam which would occur if the angle were very small, or the tendency to slip if the angle were very large.

The disc A is in the form of a sleeve 73 having a circular flange 74 thereon to which is secured a ring 75 of fibre or other material having a high coefficient of friction, the periphery of the ring of fibre being coned to be engaged by the coned flange on the sleeve 64. The second disc B is similarly constructed, i. e. it comprises a sleeve 76, a conical flange 77 and a ring 78 of fibre and the sleeve 76 of the second disc is externally screw threaded to receive an internal screw thereof formed on the sleeve 73 of the first disc. The sleeve 76 is also screw threaded internally, the pitch of the internal threads on this sleeve being one half the pitch of the threads externally of the sleeve. The sleeve 73 of the first disc is connected to the third spindle 45 so that the disc can slide but is prevented from rotating relatively to the shaft; this is effected by pinning to the spindle 45 a sleeve 79 having a projecting lug 80 constituting a key extending into a keyway formed internally in the sleeve.

The sleeve 76 of the disc B is similarly connected to the shaft by a sleeve 81 provided with an internal keyway 82 which receives a key 83 on the spindle 45 so that this sleeve 81 can slide but is prevented from relative rotation with respect to the spindle. This sleeve 81 is provided with a projection 84 which normally enters any one of a plurality of apertures in the flange portion 77 of the disc B the projection 84 being caused to extend into the apertures by a spring 85 located around the spindle 45 and abutting at one end against a flange 86 formed on the sleeve 81 and at the other end against a collar 87 screwed on and pinned to the extremity of the spindle 45.

The flange portion 77 of the disc B is provided with bevel teeth 88 which can be engaged by bevel teeth 89 formed on a spindle 90 having an operating handle 91 the whole forming an adjusting key for varying the velocity ratio between the discs and coned members, the casing of the mechanism shown in Figures 1–13 being provided with an aperture to enable the adjusting key to be inserted into adjusting position.

The extremity of the spindle 90 is extended beyond the bevel teeth thereon and the extended portion is reduced in diameter to enter an aperture 92 formed in the spring pressed sleeve 81 the arrangement of the bevel teeth 88 on the flange 77 and the location of the aperture 92 being such that when the reduced portion of the spindle 90 is inserted into its aperture and the spindle is rotated, the sleeve 81 is by the initial rotation, slid against the action of its spring 85 to cause the projection 84 on the sleeve to move out of the apertures in the flange portion 77 of the disc, B. This initial operation allows the disc B to be rotated as well as slidden relatively to the spindle 45 and continued rotation of the adjusting spindle 90 causes the disc to rotate whereby it is caused to move axially with respect to the spindle on account of the screw threads formed internally on the sleeve 76 of the disc B and on the spindle. The rotation of the disc B also causes the disc A to move axially with respect to the spindle 45 on account of the co-operating screw threads formed externally on the sleeve portion 76 of the disc B and internally on the sleeve portion 73 of the disc A. As the pitch of the screw threads on the spindle 45 and internally on the sleeve portion 76 is one half that of the screw threads externally of the said sleeve and internally of the sleeve portion 73, it will be seen that rotation of the disc B by the adjusting spindle 90 will cause the two discs to move simultaneously and through equal distances either towards or away from one another so that the discs are at all times symmetrical about the transverse mean centre line of the coned members. The axial movement of the discs effects a variation in the velocity ratio between the discs and the coned members and hence between the spindles, which latter are allowed to accommodate themselves to the adjusted positions of the discs by the pivotally mounted bracket 67 carrying the spindle 62 on which the coned members are mounted.

Preferably there is provided a spring 93 which supplements the contact pressure between the coned members and discs, the spring being anchored at one end to the bracket 67 and at the other end to the frame.

It will be seen that with the arrangement shown in Figures 14 and 15, not only is the drive efficiently transmitted from the discs to the coned members, but that if the direction of drive is reversed, slip will readily occur between the discs and coned members and thus the arrangement provides an effective one way variable speed drive which is capable of general use.

What I claim is:—

1. In an apparatus for delivering measured quantities of liquid, the combination of a liquid flow cut-off device biased to its cut-off position, means for retaining the cut-off device in its non-cut-off position, a pair of elements each associated with said retaining means and being adapted when both moved to operative positions to render said retaining means ineffective, means responsive to flow of fluid being delivered for driving one of said elements to operative position cyclically during delivery of liquid and for driving the other element to operative position just before the end of delivery of a predetermined quantity of liquid determined by the position of said other element at the start of delivery, means for pre-setting said last element, an indicator for indicating the quantity of liquid delivered, means for zeroizing the indicator, and means for preventing pre-setting of the pre-setting means until the indicator has been zeroized.

2. In apparatus for delivery measured quantities of liquid, the combination of a liquid flow cut-off device biased to its cut-off position, a pair of detents for retaining the cut-off device in its noncut-off position, a pair of elements associated respectively with said detents and being adapted when both moved to operative positions to render said detents ineffective, means responsive to flow of fluid being delivered for driving one of said elements to operative position cyclically during delivery of liquid and for driving the other element to operative position just before the end of delivery of a predetermined quantity of liquid determined by the position of said other element at the start of delivery, means for pre-setting said last element, an indicator for indicating the quantity of liquid delivered, means for zeroizing the indicator, and means for preventing pre-setting of the pre-setting means until the indicator has been zeroized.

3. In apparatus for delivering measured quantities of liquid, the combination of a liquid flow cut-off device biased to its cut-off position, means for retaining the cut-off device in its noncut-off position, a pair of elements each associated with said retaining means and being adapted when both moved to operative positions to render said retaining means ineffective, means responsive to flow of fluid being delivered for driving one of said elements to operative position cyclically during delivery of liquid and for driving the other element to operative position just before the end of delivery of a predetermined quantity of liquid determined by the position of said other element at the start of delivery, means for pre-setting said last element, an indicator for indicating the quantity of liquid delivered, means for zeroizing the indicator, means for preventing pre-setting of the pre-setting means until the indicator has been zeroized, and means for preventing the cut-off device from being moved into its noncut-off position until the pre-setting means has been pre-set.

4. In apparatus for delivering measured quantities of liquid, the combination of a liquid flow cut-off device biased to its cut-off position, a pair of detents for retaining the cut-off device in its noncut-off position, a pair of elements associated respectively with said detents and being adapted when both moved to operative positions to render said detents ineffective, means responsive to flow of fluid being delivered for driving one of said elements to operative position cyclically during delivery of liquid and for driving the other element to operative position just before the end of delivery of a predetermined quantity of liquid determined by the position of said other element at the start of delivery, means for pre-setting said last element, an indicator for indicating the quantity of liquid delivered, means for zeroizing the indicator, means for preventing pre-setting of the pre-setting means until the indicator has been zeroized, and means for preventing the cut-off device from being moved into its noncut-off position until the pre-setting means has been pre-set.

5. In apparatus for delivering measured quantities of liquid, the combination of a liquid flow cut-off device biased to its cut-off position, a pair of detents for retaining the cut-off device in its noncut-off position, a pair of elements associated respectively with said detents and being adapted when both moved to operative positions to render said detents ineffective, means responsive to flow of fluid being delivered for driving one of said elements to operative position cyclically during delivery of liquid and for driving the other element to operative position just before the end of delivery of a predetermined quantity of liquid determined by the position of said other element at the start of delivery, a pre-setting device, a pawl and ratchet device for connecting said other element to said fluid flow responsive means and to said pre-setting device, a spring interposed between the pre-setting device and the pawl and ratchet device, said spring being adapted to be stressed initially by the setting operation whereby to urge the teeth of the ratchet wheel and pawl into contact at the end of the setting operation.

6. In apparatus for delivering measured quantities of liquid, the combination of a liquid flow cut-off device biased to its cut-off position, a pair of detents for retaining the cut-off device in its noncut-off position, a pair of elements associated respectively with said detents and being adapted to render said detents ineffective to move the liquid flow cut-off device in a single operation from its noncut-off position to cut-off position only when both are moved to operative positions, means responsive to flow of fluid being delivered for driving one of said elements to operative position cyclically during delivery of liquid and for driving the other element to operative position just before the end of delivery of a predetermined quantity of liquid determined by the position of said other element at the start of delivery, means for pre-setting said last element, and a variable speed gear interposed between said fluid flow responsive driving means and said detent operating elements to permit an adjustment to the rate of flow of fluid.

7. In apparatus for delivering measured quantities of liquid, the combination of a liquid flow cut-off device biased to its cut-off position, a pair of detents for retaining the cut-off device in its noncut-off position, a pair of elements associated respectively with said detents and being adapted when both moved to operative positions to render said detents ineffective, means responsive to flow of fluid being delivered for driving one of said elements to operative position cyclically during delivery of liquid and for driving the other element to operative position just before the end of delivery of a predetermined quantity of liquid determined by the position of said other element at the start of delivery, a pre-setting device, a pawl and ratchet device for connecting said other element to said fluid flow responsive means and to said pre-setting device, a spring interposed between the pre-setting device and the pawl and ratchet device, said spring being adapted to be stressed initially by the setting operation whereby to urge the teeth of the ratchet wheel and pawl into contact at the end of the setting operation, an indicator for indicating the quantity of liquid delivered, means for zeroizing the indicator, means for preventing pre-setting of the pre-setting means until the indicator has been zeroized, and means for preventing the cut-off device from being moved into its noncut-off position until the pre-setting means has been pre-set.

8. A liquid dispensing apparatus having in combination, flow establishing means, valve means controlling the flow of liquid, metering means through which the liquid passes, means movable by said metering means in proportion to the amount of liquid passed through said metering means, and means for controlling said valve means operable to open said valve only when said movable means is at a predetermined initial position.

9. A liquid dispensing apparatus having in combination, a pump, a valve, a meter through which liquid passes, an indicator movable by said meter in proportion to the amount of liquid passed through said meter, means for holding the valve open to permit delivery of a desired amount of liquid, means for closing the valve, means to return the indicator to zero, and means for opening said valve operable only when the returning means is in a given predetermined position.

10. A liquid dispensing apparatus having in combination, flow establishing means, valve means controlling the flow of liquid, metering means through which the liquid passes, indicating means movable by said metering means in proportion to the amount of liquid passed through said metering means, valve opening means, and movable means normally preventing operation of said valve opening means except when said indicating means is in a given predetermined position.

11. A liquid dispensing apparatus having in combination, flow establishing means, valve means controlling the flow of liquid, metering means through which the liquid passes, indicating means movable by said metering means in proportion to the amount of liquid passed through said metering means, means for restoring said indicating means to zero, valve opening means, means normally preventing the operation of said valve opening means, and means operable only when said indicator has been restored to zero for releasing said preventing means and permitting operation of said valve opening means.

12. A liquid dispensing apparatus having in combination, flow establishing means, valve means controlling the flow of liquid, metering means through which the liquid passes, indicating means movable by said metering means in proportion to the amount of liquid passed through said metering means, means for restoring said indicator to zero, means for limiting the amount of liquid delivered for a single opening of said valve means, means for closing said valve, means for normally preventing the reopening of said valve means, and means operable only when said indicating means has been restored to zero for releasing said preventing means and permitting opening said valve means.

13. A liquid dispensing apparatus having in combination, flow establishing means, valve means controlling the flow of liquid, metering means through which the liquid passes, indicating means movable by said metering means in proportion to the amount of liquid passed through said metering means, a lever for actuating said valve means, means for latching said lever in valve open position, means to release said latching means to close said valve, and means to prevent moving said valve actuating lever to valve open position except when said indicating means is in a given predetermined position.

14. A liquid dispensing apparatus having in combination, flow establishing means, valve means controlling the flow of liquid, metering means through which the liquid passes, indicating means movable by said metering means in proportion to the amount of liquid passed through said metering means, a lever for actuating said valve means, means for latching said lever in valve open position, means to release said latching means to close said valve, means to latch said lever in valve closed position, and means to release said last mentioned latch means only when the indicator has been restored to a given predetermined position.

15. A liquid dispensing apparatus having in combination, flow establishing means, valve means controlling the flow of liquid, metering means through which the liquid passes, indicating means movable by said metering means in proportion to the amount of liquid passed through said metering means, a lever for actuating said valve means, means for latching said lever in valve open position, means to release said latching means to close said valve when a predetermined amount of liquid has been delivered, means to latch said lever in valve closed position, and means to release said last mentioned latch means only when the indicator has been restored to a given predetermined position.

16. A liquid dispensing apparatus having in combination, flow establishing means, valve means controlling the flow of liquid, metering means through which the liquid passes, indicating means movable by said metering means in proportion to the amount of liquid passed through said metering means, a lever for actuating said valve means, means for latching said lever in valve open position, means to manually release said latching means to close said valve, means to latch said lever in valve closed position, and means to release said last mentioned latch means only when the indicator has been restored to a given predetermined position.

17. A liquid dispensing apparatus having in combination, flow establishing means, valve means controlling the flow of liquid, metering means through which the liquid passes, indicating means movable by said metering means in proportion to the amount of liquid passed through said metering means, a lever for actuating said valve, means for latching said lever in valve closed position and means for releasing said latching means only when the indicating means has been restored to a given predetermined position.

18. A liquid dispensing apparatus having in combination, flow establishing means, a valve controlling the flow of liquid, metering means through which the liquid passes, an amount indicator movable by said metering means, proportional to the amount of liquid passed through the meter, means for restoring the amount indicator to zero, a predeterminer including an indicator settable according to the amount of fluid to be delivered in a given transaction driven by said meter, means for operating said valve, means preventing the movement of said operating means to open said valve except when the amount indicator has been restored to zero, means responsive to setting the predeterminer for releasing said operating means, means for latching said valve operating means in valve open position, and means for releasing said latching means to close said valve when the desired amount of liquid has been delivered.

19. A liquid dispensing apparatus having in combination, flow establishing means, a valve controlling the flow of liquid, means to open said valve, metering means through which the liquid passes, an indicator movable by said meter from zero proportional to the amount of liquid passed through said metering means, means controlled by the indicator to operate the valve opening means only when the indicator is at zero, means to hold the valve in open position, means to close the valve, and means to hold the valve in closed position until the indicator has been restored to zero.

20. A liquid dispensing apparatus having in combination, flow establishing means, a valve controlling the flow of liquid, metering means through which the liquid passes, an amount indicator movable by said metering means proportional to the amount of fluid passed through said metering means, a predeterminer comprising means movable by said metering means proportional to the amount of fluid passed through said metering means, means for restoring said amount indicator to zero and releasing said predeterminer, means for latching said valve in a closed position, means for resetting said predeterminer and releasing said latching means, means for opening said valve, means for latching said valve in open position, means operable by the predeterminer when the desired amount of liquid has passed through the metering means to release said last mentioned latching means and means to close said valve.

21. In a liquid dispensing apparatus provided with a metering means, a shaft driven by said metering means for actuating an indicating means, a notched disk on said shaft, a second shaft driven by said metering means at an angle to said first shaft for actuating a predeterminer, a cam on said second shaft abutting said disk when the predeterminer is in initial position and movable through said notch to set the predeterminer when the indicating means is in a given predetermined position.

22. In an apparatus for delivering measured quantities of liquid the combination comprising flow establishing means, metering means through which the liquid passes, indicating means movable by said metering means away from an initial position proportional to the amount of liquid passed through said metering means, means for restoring said indicating means to initial position, a predeterminer variably settable and movable by said metering means toward an initial position proportional to the amount of liquid passed through said metering means, means actuated by the return of the predeterminer to initial position to prevent the flow of liquid and means actuated with the indicating means to prevent resetting the predeterminer from initial position except when the indicating means has been restored to initial position.

23. In an apparatus for delivering measured quantities of liquid the combination comprising flow establishing means, metering means through which the liquid passes, indicating means movable by said metering means in proportion to the amount of liquid passed through said metering means, means to restore said indicating means to a given predetermined position, settable means to limit the amount of liquid delivered in a given transaction, means to preset the limiting means, and means to prevent setting the limiting means except when the indicating means has been restored to a given predetermined position.

24. In an apparatus for delivering measured quantities of liquid, the combination comprising flow establishing means, metering means through which the liquid passes, indicating means movable by said metering means in proportion to the amount of liquid passed through said metering means, means for restoring the indicating means to a predetermined position, means variably settable according to the amount of liquid to be dispensed in a given transaction also driven by said metering means and means cooperating with the indicating means to prevent resetting the variably settable means except when the indicating means is in a given predetermined position.

25. A liquid dispensing apparatus having, in combination, liquid flow establishing means, controlling means therefor comprising means turnable about an axis and formed with an abutment, a rotatable shaft, indicating means movable to zero upon rotation of said shaft, means carried by said shaft having a peripheral surface formed with a recess, a pivoted lever having a portion adapted to engage the abutment to prevent movement of said controlling means, and a second portion adapted to be engaged by the peripheral surface to position said lever in position to engage the abutment to prevent the establishment of flow of liquid.

26. In apparatus for delivering measured quantities of liquid, the combination of a liquid flow cut-off device biased to its cut-off position, means for retaining the cut-off device in a single non-cut-off position, a pair of elements each associated with said retaining means and being adapted to render said retaining means ineffective to move the liquid flow cut-off device in a single operation from its non-cut-off position to cut-off position only when both are moved to operative positions, means responsive to flow of liquid being delivered for driving one of said elements to operative position cyclically during delivery of liquid and for driving the other element to operative position just before the end of delivery of a predetermined quantity of liquid determined by the position of said other element at the start of delivery, and means for presetting said last element.

27. In apparatus for delivering measured quantities of liquid, the combination of a liquid flow cut-off device biased to its cut-off position, means for retaining the cut-off device in its non-cut-off position, a pair of elements each associated with said retaining means and being adapted to render said retaining means ineffective to move the liquid flow cut-off device in a single operation from its non-cut-off position to cut-off position only when both are moved to cut-off position, means responsive to flow of liquid being delivered for driving one of said elements to operative position cyclically at the end of delivery of each unit quantity of liquid and for driving the other element to operative position just before the end of delivery of a predetermined number of units of liquid determined by the position of said other element at the start of delivery, and means for pre-setting said last element.

28. In apparatus for delivering measured quantities of liquid, the combination of a liquid flow cut-off device biased to its cut-off position, a pair of detents for retaining the cut-off device in its non-cut-off position, a pair of elements associated respectively with said detents and being adapted to render said detents ineffective to move the liquid flow cut-off device in a single operation from its non-cut-off position to cut-off position only when both are moved to operative positions, means responsive to flow of liquid being delivered for driving one of said elements to operative position cyclically during delivery of liquid and for driving the other element to operative position just before the end of delivery of a predetermined quantity of liquid determined by the position of said other element at the start of delivery, and means for presetting said last element.

29. A liquid dispensing system including flow establishing means, valve means controlling the flow of liquid, means for holding the valve means in open position, means for holding the valve means in closed position, a liquid meter for measuring the dispensed liquid, an indicator driven by said meter and having a predetermined initial position, and means to prevent opening the valve means when said indicator is in other than initial position.

30. A liquid dispensing system including flow establishing means, valve means controlling the flow of liquid, means for holding the valve means in open position, means for holding the valve means in closed position, a liquid meter for measuring the dispensed liquid, a resettable indicator driven by said meter and having a predetermined initial position, and means operated by the departure of the indicator from initial position to prevent opening the valve means.

31. A liquid dispensing system including flow establishing means, valve means controlling the flow of liquid, means for holding the valve means in open position, means for holding the valve means in closed position, a liquid meter for measuring the dispensed liquid, a resettable indicator driven by said meter and having a predetermined initial position, means for locking the valve means in closed position and means operated by the departure of the indicator from initial position for preventing displacement of the locking means until the indicator has been reset to initial position.

32. In a fluid dispensing apparatus, in combination, a dispensing line, means to establish a flow of fluid through the line comprising a pump and a meter measuring the quantities of liquid flowing to the line, valve means in said line adapted to permit and prevent the flow of fluid, an indicator driven by the meter and visually indicating the quantities of fluid flowing to the line and means for controlling the valve means whereby the valve means is initially operable to permit the flow of fluid only when said indicating means is in a predetermined position.

33. In a fluid dispensing apparatus, in combination, a dispensing line, means to establish a flow of fluid through the line comprising a pump and a meter measuring the quantities of fluid flowing to the line, valve means in said line adapted to permit and prevent the flow of fluid, an indicator driven by the meter and visually indicating the quantities of fluid flowing to the line by a series of numerals in arithmetical progression including an initial position representing the commencement of the delivery of liquid to the line, and means for controlling the valve means whereby the valve means is initially operable to permit the flow of fluid only when said indicating means visually indicates said initial position.

34. In liquid delivery apparatus, the combination of a meter having mechanism for resetting the same to zero position, means for effecting liquid flow through the meter, valve means controlling said liquid flow, operating means for said valve means, and interconnecting means between said operating means and meter resetting mechanism for insuring return of the meter to zero position before operation of the operating means to open said valve means for starting flow produced by said liquid flow effecting means.

35. In liquid delivery apparatus, the combination of a meter having mechanism for resetting the meter to zero position, means for delivering liquid through the meter, valve means for controlling the flow of liquid, actuating means for opening and closing the valve means, said resetting means and actuating means being correlated to prevent operation of the actuating means to open said valve means after completion of a liquid delivery until actuation of the resetting means for resetting the meter.

36. In a liquid delivery apparatus, the combination of a meter, of mechanism for resetting the meter, means for delivering liquid through the meter, valve means for controlling the flow of liquid, actuating means for opening and closing the valve means, manually actuated means for operating the resetting mechanism, and means interconnecting the manually operable means and the valve actuating means to ensure the meter being at zero position when the valve means is opened.

37. In a liquid dispensing device, the combination with a pump, a valve means having a manually operable control for starting and stopping the flow of liquid, a meter having mechanism operated by the flow of liquid from the pump, manually operable resetting means for the meter, and means interengaging the means for the reset mechanism and the valve control whereby to prevent a valve opening movement of the valve control until the manual actuating of the resetting means.

38. In a liquid delivery apparatus, the combination of a meter having resetting mechanism, a pump, a valve, manually actuated means to open and close the valve, a manual actuator for the resetting mechanism, and means cooperatively related to the resetting mechanism and a part of the valve actuating means to prevent opening movement of the valve actuating means until actuation of the resetting means.

39. In liquid dispensing apparatus, in combination, liquid metering means, means to establish liquid flow through the metering means, valve means to control the flow of liquid, indicating means movable by the metering means from an initial position in proportion to the amount of liquid passed through the metering means, means to restore the indicating means to initial position, and means released by the indicating means when at zero position to permit actuation of the valve means to valve open position.

40. In liquid dispensing apparatus, the combination with a meter for measuring the volume of liquid dispensed, of a pump for dispensing liquid through said meter; means for indicating the volume of liquid thus dispensed at each dispensing operation; a valve operatively connected in series with said pump; means for controlling the operation of said valve; set-back mechanism for restoring said indicating mechanism to zero position; and means operatively connecting said set-back mechanism with said controlling means whereby said valve is held closed after each dispensing operation until the indicating mechanism is set back to zero position.

41. In liquid dispensing apparatus, the combination with a meter for measuring the volume of liquid dispensed; of a pump for dispensing liquid through said meter; means for indicating the volume of liquid thus dispensed at each dispensing operation; a valve operatively connected in series with said pump; means for controlling the operation of said valve; set back mechanism for restoring said indicating mechanism to zero position; and means operatively connecting said set-back mechanism with said controlling means, including a cam and lever whereby said valve is held closed after each dispensing operation until the indicating mechanism is set back to zero position.

42. In liquid dispensing apparatus, the combination with a meter for measuring the volume of liquid dispensed; of a pump for dispensing liquid through said meter; means for indicating the volume of liquid thus dispensed at each dispensing operation; a valve operatively connected in series with said pump; a lever for controlling the operation of said valve; a set-back mechanism for restoring said indicating mechanism to zero position; and means operatively connecting said set-back mechanism with said valve controlling lever, including a locking lever and a cam in cooperative relation with said controlling lever; whereby said valve is held closed after each dispensing operation until the indicating mechanism is set back to zero position.

43. In apparatus of the class described, a liquid delivery conduit, a meter interposed in said conduit, means for forcing liquid through said conduit and meter, a register having a movable element to indicate the quantity of liquid measured by said meter, driving means between said meter and element including a connection enabling resetting of said element without operation of the meter, valve means in said conduit movable back and forth through a predetermined range to open and close said conduit, means to open and close said valve means, means operated with said meter to close said valve means and to prevent opening said valve means until the resetting means has reset the movable element.

44. In a fluid dispensing device, the combination of a fluid delivery line, fluid forcing means associated with said line, valve means in said line selectively conditionable to open and close the fluid delivery line, flow responsive apparatus associated with the line, an indicator actuated by the flow responsive apparatus, resetting mechanism for the indicator, and an operative connection between the indicator and the valve means whereby the indicator must be reset before the fluid forcing means can deliver fluid through the line.

45. In a fluid dispensing device, the combination of a meter having a resettable indicator, valve means to control the flow of fluid through the meter, and means to set the indicator to a predetermined setting before the valve means can be actuated, said means cooperating with the valve means to prevent the restarting of fluid flow through the meter, after stopping, until the indicator is reset.

46. In a fluid dispensing device, in combination, a meter having a resettable indicator adapted to be actuated in response to fluid flowing through the meter, valve means controlling the flow of fluid through the meter, and means to reset the indicator and control the fluid flow in a desired sequence, said means preventing the reopening of the valve means for restarting of fluid flow through the meter, after stopping, until the indicator is reset.

47. In a fluid dispensing apparatus, the combination of means for delivering fluid therefrom, valve means for controlling the flow of fluid, indicating means for determining the quantities of fluid delivered, and means associated with said indicating means, for controlling said valve means, whereby said valve means is initially operable to permit the flow of fluid only when said indicating means is in a predetermined position.

48. In a fluid dispensing apparatus or the like, the combination of means for discharging quantities of fluid, said means including a fluid meter and a valve, indicating means operable in accordance with said meter for determining the quantities of fluid discharged from said apparatus, means for opening said valve to discharge said fluid, and means for controlling said last-mentioned means whereby the same is initially operable only when said indicating means is in a predetermined position.

REUBEN ERNEST HANDFORD.

CERTIFICATE OF CORRECTION.

Patent No. 2,052,530.  August 25, 1936.

REUBEN ERNEST HANDFORD.

It is hereby certified that error appears in the printed specification of the above numbered patent requiring correction as follows: Page 2, second column, line 70, for the word "present" read preset; and that the said Letters Patent should be read with this correction therein that the same may conform to the record of the case in the Patent Office.

Signed and sealed this 8th day of December, A. D. 1936.

Henry Van Arsdale
Acting Commissioner of Patents.

(Seal)

duit and meter, a register having a movable element to indicate the quantity of liquid measured by said meter, driving means between said meter and element including a connection enabling resetting of said element without operation of the meter, valve means in said conduit movable back and forth through a predetermined range to open and close said conduit, means to open and close said valve means, means operated with said meter to close said valve means and to prevent opening said valve means until the resetting means has reset the movable element.

44. In a fluid dispensing device, the combination of a fluid delivery line, fluid forcing means associated with said line, valve means in said line selectively conditionable to open and close the fluid delivery line, flow responsive apparatus associated with the line, an indicator actuated by the flow responsive apparatus, resetting mechanism for the indicator, and an operative connection between the indicator and the valve means whereby the indicator must be reset before the fluid forcing means can deliver fluid through the line.

45. In a fluid dispensing device, the combination of a meter having a resettable indicator, valve means to control the flow of fluid through the meter, and means to set the indicator to a predetermined setting before the valve means can be actuated, said means cooperating with the valve means to prevent the restarting of fluid flow through the meter, after stopping, until the indicator is reset.

46. In a fluid dispensing device, in combination, a meter having a resettable indicator adapted to be actuated in response to fluid flowing through the meter, valve means controlling the flow of fluid through the meter, and means to reset the indicator and control the fluid flow in a desired sequence, said means preventing the reopening of the valve means for restarting of fluid flow through the meter, after stopping, until the indicator is reset.

47. In a fluid dispensing apparatus, the combination of means for delivering fluid therefrom, valve means for controlling the flow of fluid, indicating means for determining the quantities of fluid delivered, and means associated with said indicating means, for controlling said valve means, whereby said valve means is initially operable to permit the flow of fluid only when said indicating means is in a predetermined position.

48. In a fluid dispensing apparatus or the like, the combination of means for discharging quantities of fluid, said means including a fluid meter and a valve, indicating means operable in accordance with said meter for determining the quantities of fluid discharged from said apparatus, means for opening said valve to discharge said fluid, and means for controlling said last-mentioned means whereby the same is initially operable only when said indicating means is in a predetermined position.

REUBEN ERNEST HANDFORD.

CERTIFICATE OF CORRECTION.

Patent No. 2,052,530.   August 25, 1936.

REUBEN ERNEST HANDFORD.

It is hereby certified that error appears in the printed specification of the above numbered patent requiring correction as follows: Page 2, second column, line 70, for the word "present" read preset; and that the said Letters Patent should be read with this correction therein that the same may conform to the record of the case in the Patent Office.

Signed and sealed this 8th day of December, A. D. 1936.

Henry Van Arsdale
Acting Commissioner of Patents.

(Seal)

CERTIFICATE OF CORRECTION.

Patent No. 2,052,530. August 25, 1936.

REUBEN ERNEST HANDFORD.

It is hereby certified that error appears in the printed specification of the above numbered patent requiring correction as follows: Page 2, second column, line 70, for the word "present" read preset; and that the said Letters Patent should be read with this correction therein that the same may conform to the record of the case in the Patent Office.

Signed and sealed this 8th day of December, A. D. 1936.

(Seal)

Henry Van Arsdale
Acting Commissioner of Patents.